United States Patent
Hotta et al.

(10) Patent No.: US 12,224,689 B2
(45) Date of Patent: Feb. 11, 2025

(54) VENTILATION BLOWER

(71) Applicant: Mitsubishi Electric Corporation, Tokyo (JP)

(72) Inventors: Kazuhiko Hotta, Tokyo (JP); Takuya Nakamura, Tokyo (JP); Ryota Kurosawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 45 days.

(21) Appl. No.: 18/247,768

(22) PCT Filed: Dec. 23, 2020

(86) PCT No.: PCT/JP2020/048282
§ 371 (c)(1),
(2) Date: Apr. 4, 2023

(87) PCT Pub. No.: WO2022/137406
PCT Pub. Date: Jun. 30, 2022

(65) Prior Publication Data
US 2023/0370010 A1 Nov. 16, 2023

(51) Int. Cl.
*H02P 21/00* (2016.01)
*H02P 21/22* (2016.01)
*H02P 27/12* (2006.01)

(52) U.S. Cl.
CPC .............. *H02P 27/12* (2013.01); *H02P 21/22* (2016.02)

(58) Field of Classification Search
CPC ................................ H02P 27/12; H02P 21/22
USPC ......................................................... 318/503
See application file for complete search history.

(56) References Cited

U.S. PATENT DOCUMENTS 9,797,406 B2 10/2017 Ishikawa
2019/0376715 A1 12/2019 Blanchard

FOREIGN PATENT DOCUMENTS

JP 5743909 B2 7/2015
JP 6374662 B2 8/2018

OTHER PUBLICATIONS

Extended European Search Report dated Jan. 17, 2024, issued in the corresponding European Patent Application No. 20966896.1, 7 pages.
International Search Report (PCT/ISA/210) with English translation and Written Opinion (PCT/ISA/237) mailed on Mar. 2, 2021, by the Japanese Patent Office as the International Searching Authority for International Application No. PCT/JP2020/048282.

*Primary Examiner* — Erick D Glass
(74) *Attorney, Agent, or Firm* — BUCHANAN, INGERSOLL & ROONEY PC

(57) ABSTRACT

A ventilation blower includes an inverter main circuit, a motor body driven by the main circuit, a control circuit that controls the main circuit, and a storage device. The storage device stores an angular velocity of a motor rotor and a torque current value at a first operation point at which to obtain a first air volume on a first load characteristic, and the angular velocity and the torque current value at a second operation point at which to obtain a second air volume on the load characteristic, the second air volume being different from the first air volume. The control circuit calculates, from the angular velocities and the torque current values at the first and second operation points, the angular velocity and the torque current value at a third operation point at which to obtain a third air volume on the load characteristic.

2 Claims, 8 Drawing Sheets

FIG.7

|  | POINT ON LOAD CURVE n | POINT ON LOAD CURVE k |
|---|---|---|
| POINT AT WHICH VENTILATION AIR VOLUME IS CONSTANT AT QL | $(\omega_{Ln}, Iq_{Ln})$ | $(\omega_{Lk}, Iq_{Lk})$ |
| POINT AT WHICH VENTILATION AIR VOLUME IS CONSTANT AT QH | $(\omega_{Hn}, Iq_{Hn})$ | $(\omega_{Hk}, Iq_{Hk})$ |

FIG.8

|  | POINT ON LOAD CURVE n | POINT ON LOAD CURVE k |
|---|---|---|
| POINT AT WHICH VENTILATION AIR VOLUME IS CONSTANT AT QM | $(\omega_{Mn}, Iq_{Mn}(=\alpha_n \cdot \omega_{Mn}^2 + \beta_n))$ | $(\omega_{Mk}, Iq_{Mk}(=\alpha_k \cdot \omega_{Mk}^2 + \beta_k))$ |

FIG.9

| | POINT ON LOAD CURVE n1 | POINT ON LOAD CURVE n2 | ... | POINT ON LOAD CURVE m-1 | POINT ON LOAD CURVE m |
|---|---|---|---|---|---|
| POINT AT WHICH VENTILATION AIR VOLUME IS CONSTANT AT QL | $(\omega_{Ln1}, Iq_{Ln1})$ | $(\omega_{Ln2}, Iq_{Ln2})$ | ... | $(\omega_{L[m-1]}, Iq_{L[m-1]})$ | $(\omega_{Lm}, Iq_{Lm})$ |
| POINT AT WHICH VENTILATION AIR VOLUME IS CONSTANT AT QH | $(\omega_{Hn1}, Iq_{Hn1})$ | $(\omega_{Hn2}, Iq_{Hn2})$ | ... | $(\omega_{H[m-1]}, Iq_{H[m-1]})$ | $(\omega_{Hm}, Iq_{Hm})$ |
| POINT AT WHICH VENTILATION AIR VOLUME IS CONSTANT AT QM1 | $(\omega_{M1n1}, Iq_{M1n1})$ | $(\omega_{M1n2}, Iq_{M1n2})$ | ... | $(\omega_{M1[m-1]}, Iq_{M1[m-1]})$ | $(\omega_{M1m}, Iq_{M1m})$ |
| POINT AT WHICH VENTILATION AIR VOLUME IS CONSTANT AT QM2 | $(\omega_{M2n1}, Iq_{M2n1})$ | $(\omega_{M2n2}, Iq_{M2n2})$ | ... | $(\omega_{M2[m-1]}, Iq_{M2[m-1]})$ | $(\omega_{M2m}, Iq_{M2m})$ |
| POINT AT WHICH VENTILATION AIR VOLUME IS CONSTANT AT QM3 | $(\omega_{M3n1}, Iq_{M3n1})$ | $(\omega_{M3n2}, Iq_{M3n2})$ | ... | $(\omega_{M3[m-1]}, Iq_{M3[m-1]})$ | $(\omega_{M3m}, Iq_{M3m})$ |
| POINT AT WHICH VENTILATION AIR VOLUME IS CONSTANT AT QM... | ... | ... | ... | ... | ... |
| POINT AT WHICH VENTILATION AIR VOLUME IS CONSTANT AT QM... | ... | ... | ... | ... | ... |

VENTILATION BLOWER

FIELD

The present disclosure relates to a ventilation blower utilizing a permanent-magnet synchronous motor.

BACKGROUND

In recent years, market demands for energy saving, noise reduction, and the like for ventilation blowers such as ventilation fans and blowers have been increasing. In order to achieve energy saving and noise reduction, it is effective to operate a ventilation blower, ventilating a space such as a living room with a minimum air volume. Since living rooms vary in volume, the minimum air volume necessary for ventilation is also variously set according to the volume of each living room. It is thus necessary to finely control the rotation speed of the ventilation blower.

The ventilation air volume varies depending on the installation environment of ventilation blowers even when the ventilation blowers of the same type are used at the same identical outputs. This is because the ventilation loss varies depending on the difference in length of a duct connected to each ventilation blower and the difference in path of the duct. For this reason, ventilation blowers that can secure an appropriate ventilation air volume according to an installation environment are desired. Note that the difference in path of the duct is, for example, a difference in the number of bends or a difference in angle of bends.

In addition, as air is required to be rapidly cleaned through ventilation for the purpose of prevention of infection of infectious viruses in recent years, there is a need to appropriately ventilate rooms at ventilation air volumes determined from the degree of contamination of air within the rooms and the number of people entering the rooms. Thus, there is an increasing demand for ventilation at an optimum ventilation air volume. For example, Patent Literature 1 and Patent Literature 2 disclose ventilation blowers that control a ventilation air volume. In such ventilation blowers, a permanent-magnet synchronous motor of the ventilation blower is controlled for adjusting a ventilation air volume.

CITATION LIST

Patent Literature

Patent Literature 1: Japanese Patent No. 5743909
Patent Literature 2: Japanese Patent No. 6374662

SUMMARY

Technical Problem

Patent Literature 1 discloses a mathematical formula in which a motor current value Im for controlling motor torque of a motor and an angular velocity $\omega$ are linearly approximated. If control is performed according to this mathematical formula, a ventilation air volume of the ventilation blower can be made substantially constant. Patent Literature 2 discloses a proportional formula of a torque current value Iq in vector control that is defined as a current proportional to motor torque of a motor, and an angular velocity $\omega$. If control is performed according to this mathematical formula, a ventilation air volume of the ventilation blower can be made substantially constant.

As the mathematical formula is calculated from an ideal characteristic of the motor and blades, actual products unfortunately include error factors that hinder the ideal characteristic. The error factors include the following examples. For example, cogging torque generated between a stator core and a rotor of the motor is an error factor. Furthermore, an increase in motor current due to an iron loss that is a loss generated inside the core material is an error factor. Furthermore, an operation torque more than expected being required due to leakage of air from a gap generated due to the structure of the blower or the like is an error factor.

In reality, the torque current value Iq and the angular velocity $\omega$ do not have a linear characteristic calculated by theory due to the influence of the error factors as exemplified. Even if ideal control based on the above theory is performed, an error occurs between a target ventilation air volume and an actual ventilation air volume.

Note that if the angular velocity $\omega$ and the torque current value Iq according to the actual situation under which the ventilation blower is installed are finely stored, the ventilation air volume according to the actual situation can be obtained. Unfortunately, this increases the angular velocities $\omega$ and torque current values Iq to store and thus the capacity of a storage device, which leads to an increase in cost.

The present disclosure has been made in view of the above, and an object of the present disclosure is to obtain a ventilation blower that enables accurate and fine air volume control as well as reducing cost.

Solution to Problem

In order to solve the above-described problems and achieve the object, a ventilation blower according to the present disclosure comprises: an inverter main circuit including a plurality of switching elements to be switched to convert direct-current power into three-phase alternating-current power; a motor body including a stator and a rotor and to be driven by the inverter main circuit; a motor control circuit to control the inverter main circuit; and a storage device. The storage device stores an angular velocity of the rotor and a torque current value at a first operation point at which to obtain a first air volume on a first load characteristic, and the angular velocity and the torque current value at a second operation point at which to obtain a second air volume on the first load characteristic, the second air volume being different from the first air volume. The motor control circuit calculates, from the angular velocity and the torque current value at the first operation point and the angular velocity and the torque current value at the second operation point, the angular velocity and the torque current value at a third operation point at which to obtain a third air volume on the first load characteristic, and the motor control circuit causes the inverter main circuit to drive the motor body with the angular velocity and the torque current value at the third operation point.

Advantageous Effect of Invention

The ventilation blower according to the present disclosure has an advantageous effect of enabling the accurate and fine air volume control as well as reducing the cost.

BRIEF DESCRIPTION OF DRAWINGS

FIG. 7 is a diagram indicating an example of actually measured values in the first embodiment.

FIG. 8 is a diagram indicating angular velocities and torque current values obtained from the actually measured values indicated in FIG. 7.

FIG. 9 is a diagram indicating an example in which operation points at which a target ventilation air volume is constant are approximated at multiple points using load characteristics.

DESCRIPTION OF EMBODIMENT

A ventilation blower according to an embodiment will be hereinafter described in detail with reference to the drawings.

First Embodiment

Figure 1:
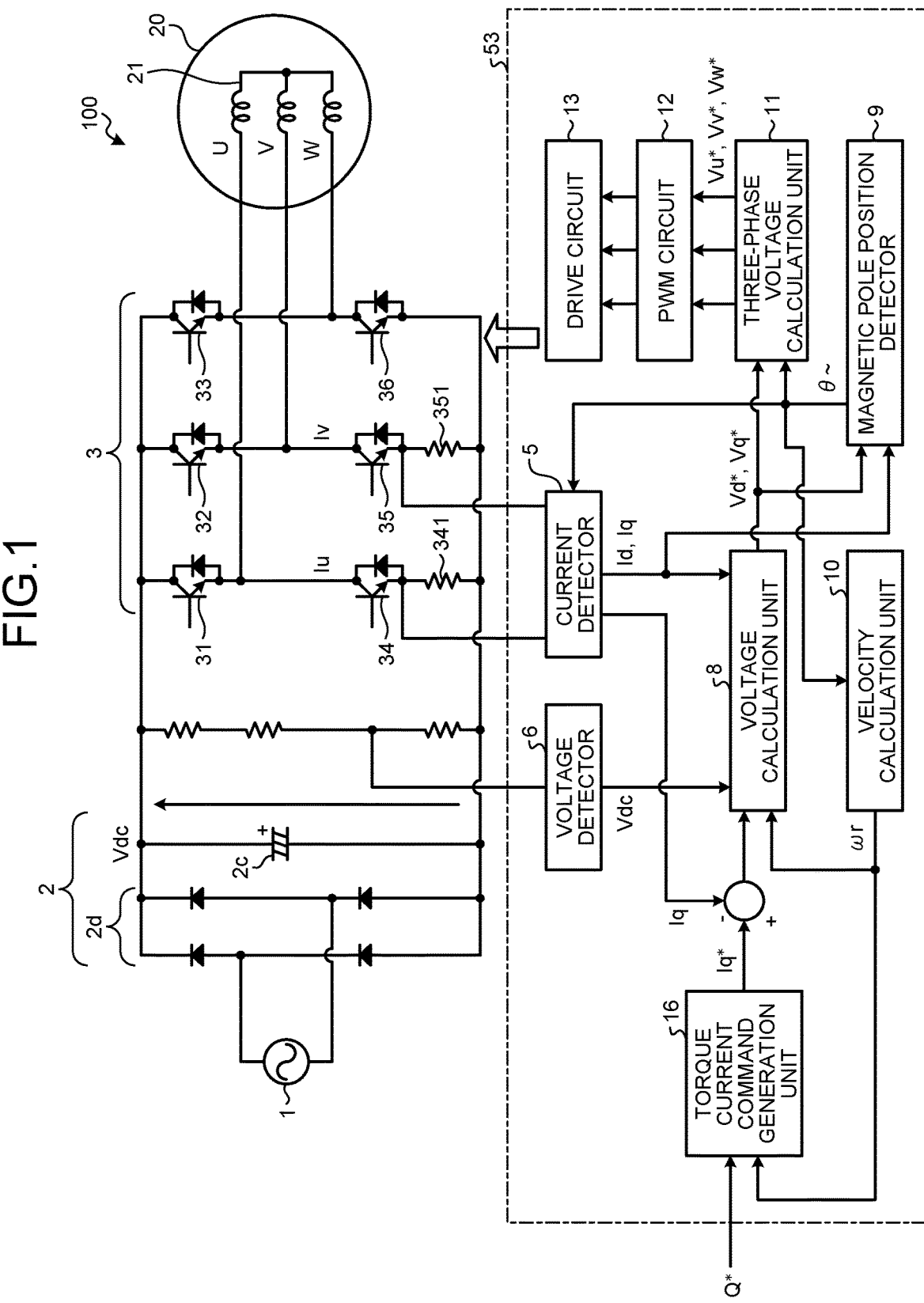
FIG. 1 is a block diagram illustrating a configuration of a permanent-magnet synchronous motor according to a first embodiment.

FIG. 1 is a block diagram illustrating a configuration of a permanent-magnet synchronous motor according to a first embodiment. A permanent-magnet synchronous motor 100 includes a rectifying and smoothing circuit 2, an inverter main circuit 3, a motor body 20 of a permanent-magnet type, and a motor torque controller 53. The circuit 2 is connected to an alternating-current power supply 1. The inverter main circuit 3 is to be PWM-driven. The motor torque controller 53 serves as a motor control circuit. The motor body 20 includes a stator 21 and a rotor of a permanent-magnet type (not illustrated).

The rectifying and smoothing circuit 2, which is made up of a rectifier circuit 2*d* and a smoothing capacitor 2*c*, converts alternating-current power supplied from the alternating-current power supply 1, to direct-current power and supplies the direct-current to the inverter main circuit 3. The inverter main circuit 3 is made up of transistors 31 to 33 that are upper-arm switching elements, and transistors 34 to 36 that are lower-arm switching elements. The transistors 31 to 36 of the inverter main circuit 3 are switched to convert the direct-current power supplied by the rectifying and smoothing circuit 2 into variable-voltage and variable-frequency three-phase alternating-current power. The three-phase alternating-current power output from the inverter main circuit 3 is supplied to the motor body 20 to drive the motor body 20. That is, three-phase alternating currents are supplied to the stator 21 to control rotation of the rotor. Note that although bipolar transistors are used as the transistors 31 to 36 in illustration of FIG. 1, metal-oxide-semiconductor field-effect transistors (MOSFETs) may be used instead because the element is not limited as long as the element is a switching element.

The motor torque controller 53 includes a voltage detector 6, a current detector 5, a voltage calculation unit 8, a magnetic pole position detector 9, a velocity calculation unit 10, a three-phase voltage calculation unit 11, a PWM circuit 12, a drive circuit 13, and a torque current command generation unit 16. The voltage detector detects a direct-current bus voltage Vdc to be input to the inverter main circuit 3. The current detector 5 detects a motor current value Iu and a motor current value Iv and converts the motor current value Iu and the motor current value Iv into an excitation current value Id and a torque current value Iq. The voltage calculation unit 8 calculates and outputs a d-axis voltage command value Vd* and a q-axis voltage command value Vq*. The magnetic pole position detector 9 obtains an estimated value $\theta\sim$ of a magnetic pole position of the rotor. The velocity calculation unit 10 calculates an angular velocity $\omega r$ from the estimated value $\theta\sim$ obtained by the magnetic pole position detector 9. The three-phase voltage calculation unit 11 calculates and outputs three-phase voltage command values Vu*, Vv*, and Vw*. The PWM circuit 12 generates and outputs pulse width modulation (PWM) signals based on the command values Vu*, Vv*, and Vw*. The drive circuit 13 drives the transistors 31 to 36 on the basis of the PWM signals.

The current detector 5 detects the motor current values Iu and Iv that flow through windings corresponding to two phases of the stator 21. Specifically, the current detector 5 detects voltage values generated by currents flowing through shunt resistors 341 and 351 that are current detection resistors connected to emitter sides of the lower-arm transistors 34 and 35, respectively, of the inverter main circuit 3, and converts the detected voltage values into the motor current value Iu and the motor current value Iv. The current detector 5 converts the thus detected motor current value Iu and motor current value Iv into the excitation current value Id and the torque current value Iq.

The voltage calculation unit 8 calculates the d-axis voltage command value Vd* and the q-axis voltage command value Vq* that allows the torque current value Iq output from the current detector 5 to approximate a torque current command value Iq*. Specifically, the voltage calculation unit 8 calculates the d-axis voltage command value Vd* and the q-axis voltage command value Vq* from the direct-current bus voltage Vdc, the excitation current value Id, the torque current value Iq, the angular velocity $\omega r$, and a differential value between the torque current command value Iq* and the torque current value Iq, and outputs the d-axis voltage command value Vd* and the q-axis voltage command value Vq* as applied voltage information.

The magnetic pole position detector 9 can use the excitation current value Id and the torque current value Iq, which are obtained by the current detector 5, as motor current information necessary for sensorless control without using a rotor magnetic pole position detection sensor. That is, the magnetic pole position detector 9 can obtain the estimated value $\theta\sim$ of the magnetic pole position of the rotor, using the excitation current value Id, the torque current value Iq, the d-axis voltage command value Vd* and the q-axis voltage command value Vq* obtained as the applied voltage information by the voltage calculation unit 8, and a motor constant. The estimated value $\theta\sim$ obtained by the magnetic pole position detector 9 is output to the current detector 5, and is used as a magnetic pole position $\theta$ for obtaining the excitation current value Id and the torque current value Iq.

The three-phase voltage calculation unit 11 calculates the three-phase voltage command values Vu*, Vv*, and Vw* from the d-axis voltage command value Vd* and the q-axis voltage command value Vq* obtained as the applied voltage information by the voltage calculation unit 8 and the estimated value θ~ obtained by the magnetic pole position detector 9, and outputs the thus calculated command values. The three-phase voltage calculation unit 11 and the PWM circuit 12, which define an inverter controller that controls the inverter main circuit 3, control the inverter main circuit 3 to cause the inverter main circuit 3 to apply three-phase voltages based on the command values Vu*, Vv*, and Vw* to the motor body 20.

The torque current command generation unit 16 calculates the torque current command value Iq* and outputs the torque current command value Iq* to the voltage calculation unit 8. Next, a configuration of the ventilation blower including the permanent-magnet synchronous motor 100 will be described, following which a method of calculating the torque current command value Iq* by the torque current command generation unit 16 will be described.

Figure 2:
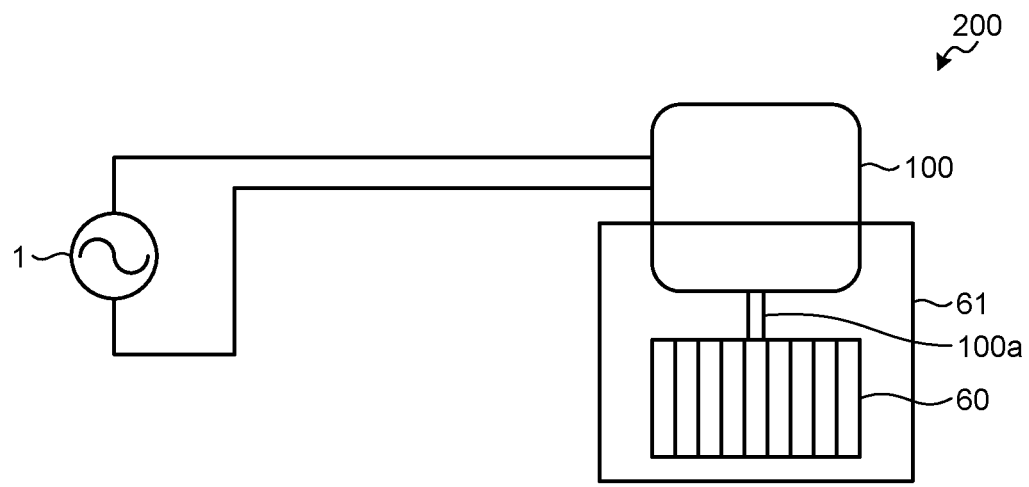
FIG. 2 is a diagram illustrating a schematic configuration of a ventilation blower using the permanent-magnet synchronous motor according to the first embodiment.

FIG. 2 is a diagram illustrating a schematic configuration of the ventilation blower using the permanent-magnet synchronous motor according to the first embodiment. A ventilation blower 200 includes the permanent-magnet synchronous motor 100, an impeller 60, and a casing 61. The impeller 60 is connected to an output shaft 100a of the permanent-magnet synchronous motor 100. The impeller 60 is housed in the casing 61. The permanent-magnet synchronous motor 100 is supplied with power from the alternating-current power supply 1. When the permanent-magnet synchronous motor 100 rotates the output shaft 100a, the impeller 60 rotates and an air flow is generated. Accordingly, ventilation is performed. A duct (not illustrated) is connected to the ventilation blower 200.

Figure 3:
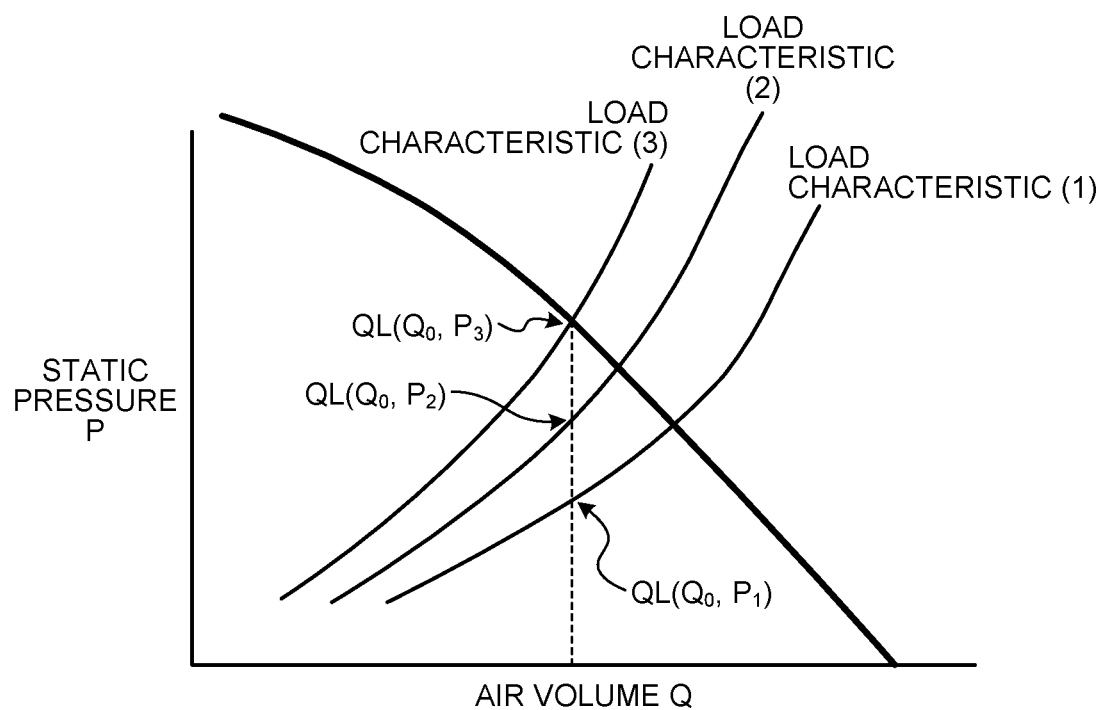
FIG. 3 is a characteristic diagram of the ventilation blower illustrated in FIG. 2.
Figure 4:
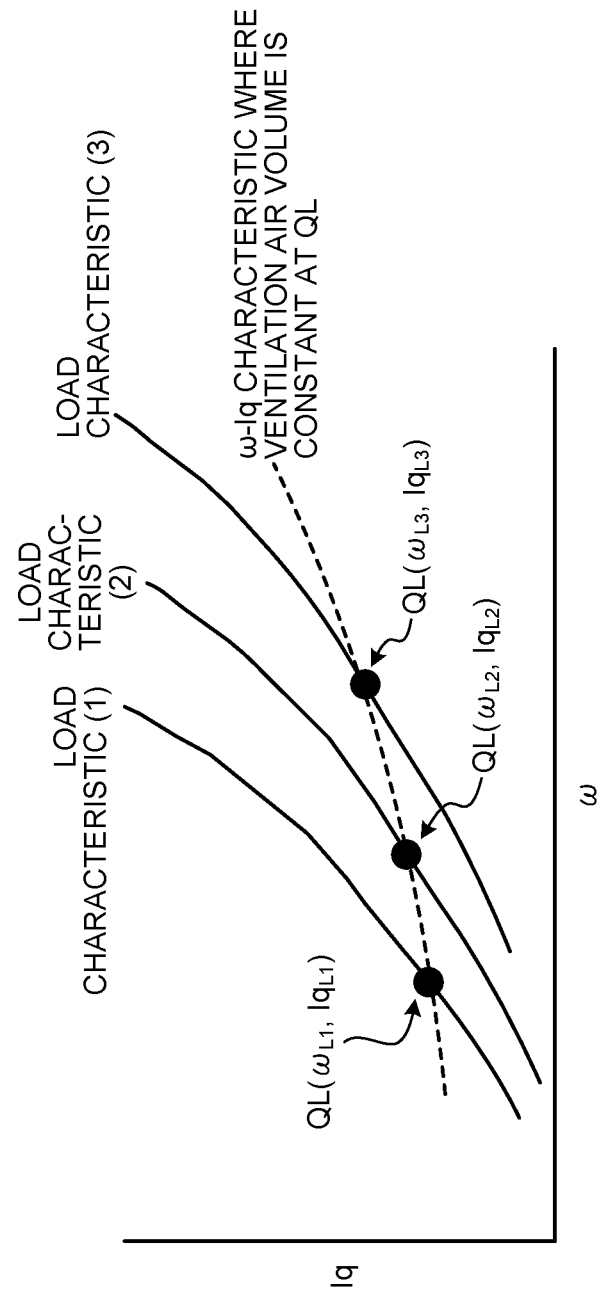
FIG. 4 is a diagram illustrating a relationship between an angular velocity and a torque current value when a ventilation air volume is controlled to be constant in the ventilation blower illustrated in FIG. 2.

FIG. 3 is a characteristic diagram of the ventilation blower illustrated in FIG. 2. FIG. 4 is a diagram illustrating a relationship between an angular velocity and a torque current value when a ventilation air volume is controlled to be constant in the ventilation blower illustrated in FIG. 2. As illustrated in FIG. 3, in order to make the ventilation air volume constant even if the load characteristic varies from (1) to (3) as a result of the load changes due to the influence of, for example, the pipe length of the duct connected to the ventilation blower 200, it is only required that the angular velocity ω and the torque current value Iq of the permanent-magnet synchronous motor 100 be controlled such that angular velocity ω and the torque current value Iq reach QL $(Q_0, P_1)$, QL $(Q_0, P_2)$, and QL $(Q_0, P_3)$. The angular velocity ω and the torque current value Iq of the permanent-magnet synchronous motor 100 in the case have a characteristic as illustrated in FIG. 4. Note that the angular velocity ω and the torque current value Iq are collectively referred to simply as a parameter in the following description.

Although the characteristic of (ω, Iq) where the ventilation air volume is constant is linear, the characteristic is not perfectly linear due to error factors such as cogging torque generated between a stator core and the rotor of the permanent-magnet synchronous motor 100, an increase in motor current due to an iron loss that is a loss generated inside the core material, and leakage of air from a gap generated due to the structure of the ventilation blower 200. In order to improve the control accuracy of the ventilation air volume, therefore, the angular velocity ω and the torque current value Iq are actually measured on two or more different load characteristics, and the angular velocity ω and the torque current value Iq are controlled such that the angular velocity ω and the torque current value Iq converge on a line connecting operation points to one another on FIG. 4 obtained from the actually measured values.

FIG. 4 illustrates an example in which parameters are actually measured on three different load characteristics. If the angular velocity ω and the torque current value Iq are controlled such that the angular velocity ω and the torque current value Iq converge on the line connecting the obtained operation points to one another, ventilation is performed at a constant ventilation air volume QL illustrated in FIG. 3. As the number of operation points obtained by actual measurement increases, the accuracy of air volume control improves. If the control range with respect to the static pressure needs widening, the line, which is a converging target, is calculated using actually measured values on four or more load characteristics, thereby widening the control range and improving the accuracy of the air volume control as well.

Increasing the number of operation points can reduce an error in air volume over a wide range, but increases information to store and hence the capacity of the storage device, which leads to an increase in cost. For this reason, the number of operation points cannot be increased to such an extent as to perform step-less air volume control, and instead, stepwise air volume control has been performed in most cases so far. On the other hand, if it is possible to calculate the parameter at the target ventilation air volume, it becomes possible to achieve the step-less air volume control without increasing the storage capacity.

Next, a calculation method for obtaining a parameter of a ventilation air volume QM, which is a target air volume, from a parameter of the ventilation air volume QL and a parameter of a ventilation air volume QH will be described. Note that the relationship between the ventilation air volumes QL, QM, and QH is QL<QM<QH. For example, the ventilation air volume QL is a ventilation air volume at the time of weak notch set in the ventilation blower 200. Furthermore, the ventilation air volume QH is a ventilation air volume at the time of strong notch set in the ventilation blower 200.

Figure 5:
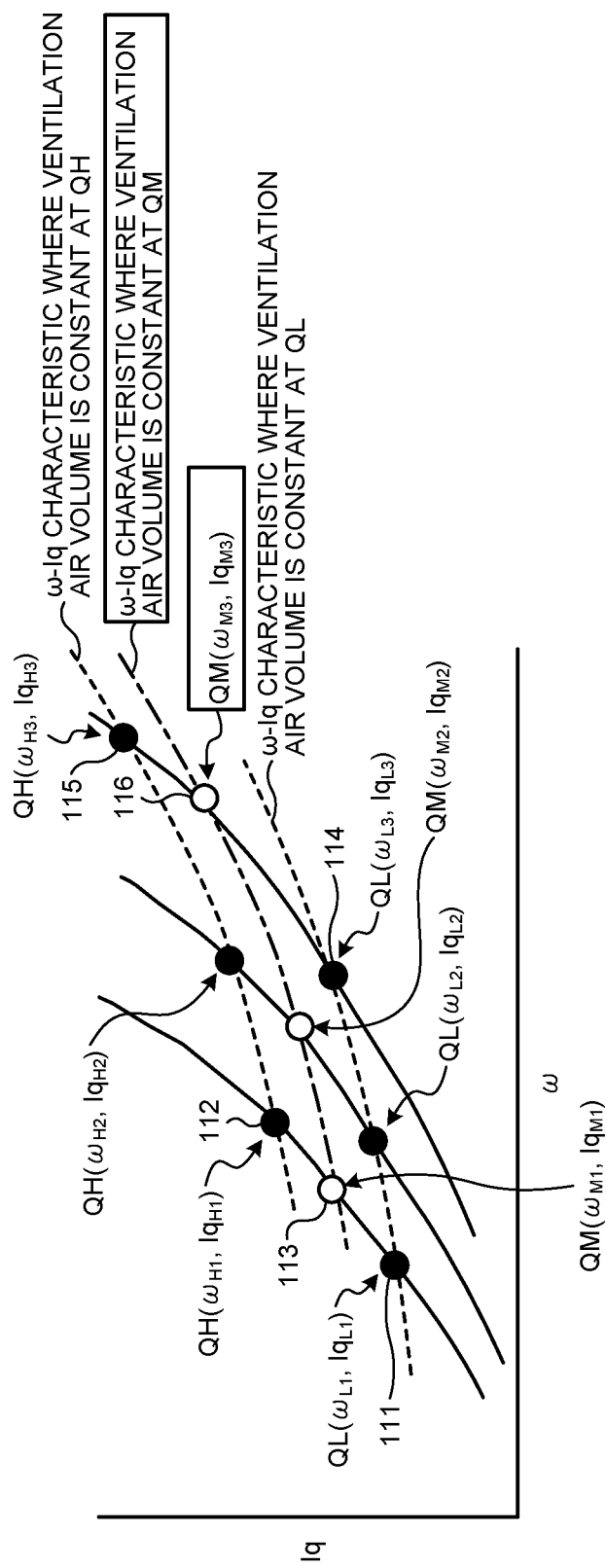
FIG. 5 is a diagram illustrating a relationship between a parameter of a ventilation air volume QL, a parameter of a ventilation air volume QH, and a parameter of a ventilation air volume QM.
Figure 6:
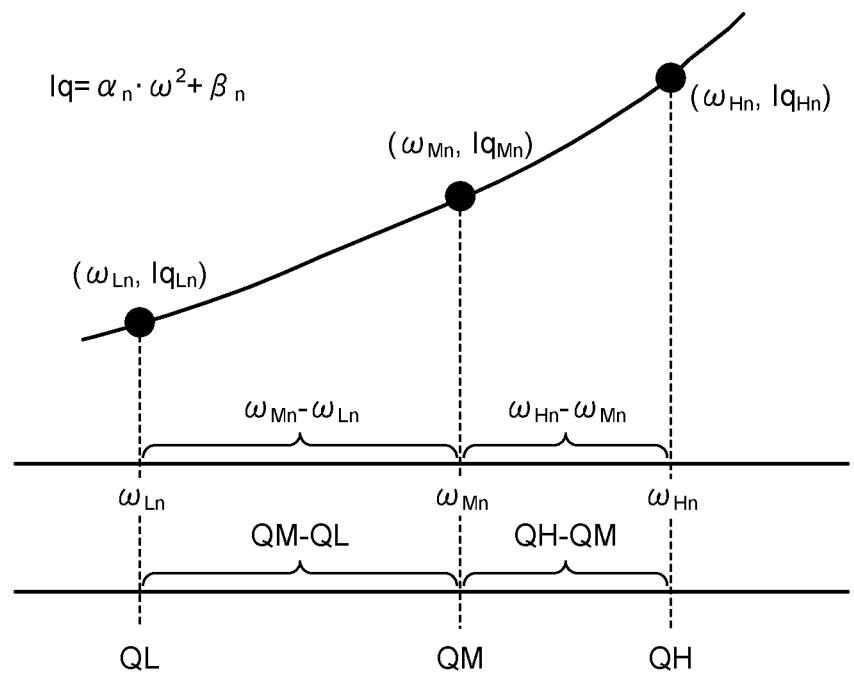
FIG. 6 is a diagram for describing calculation of the torque current value using known operation points on the same load characteristic.

FIG. 5 is a diagram illustrating a relationship between a parameter of the ventilation air volume QL, a parameter of the ventilation air volume QH, and a parameter of the ventilation air volume QM. QM ($\omega_{Mn}$, $Iq_{Mn}$), which is a parameter at the ventilation air volume QM, is obtained by calculation using QL ($\omega_{Ln}$, $Iq_{Ln}$) and QH ($\omega_{Hn}$, $Iq_{Hn}$). FIG. 6 is a diagram for describing calculation of the torque current value using known operation points on the same load characteristic. Since the ventilation air volume Q∝the angular velocity ω holds on the same load characteristic, the torque current value can be calculated according to following Formula (1) on the same load characteristic.

$$(QM_n - QL_n)/(QH_n - QM_n) = (\omega_{Mn} - \omega_{Ln})/(\omega_{Hn} - \omega_{Mn}) \quad (1)$$

Then, the angular velocity can be calculated using the following Formulae (2) and (3).

$$\omega_{Mn} = \quad (2)$$
$$((QM - QL) \cdot \omega_{Hn} + (QH - QM) \cdot \omega_{Ln})/((QH - QM) + (QM - QL))$$

$$\omega_{Mn} = ((QM - QL) \cdot \omega_{Hn} + (QH - QM) \cdot \omega_{Ln})/(QH - QL) \quad (3)$$

Since the angular velocity ω has been obtained by calculation, the value of the torque current value Iq at the angular velocity ω is then calculated. In the ventilation blower 200, the square of the angular velocity ω is proportional to the torque. Since the torque current value Iq is proportional to the torque, the square of the angular velocity ω is proportional to the torque current value Iq.

In reality, however, a relation between the angular velocity and the torque current value is not an ideal quadratic curve. Since there are factors that induce errors, the relationship between the angular velocity ω and the torque current value Iq is approximated to the following Formula (4).

$$Iq = \alpha_n \cdot \omega^2 + \beta_n \quad (4)$$

In this formula, $\alpha_n$ and $\beta_n$ are constants on the same load characteristic.

From two operation points $(\omega_{Ln}, Iq_{Ln})$ and $(\omega_{Hn}, Iq_{Hn})$ on this load characteristic, α and β are obtained using the following Formulae (5) to (8).

$$Iq_{Ln} = \alpha_n \cdot \omega_{Ln}^2 + \beta_n \quad (5)$$

$$Iq_{Hn} = \alpha_n \cdot \omega_{Hn}^2 + \beta_n \quad (6)$$

$$\alpha_n = (Iq_{Hn} - Iq_{Ln})/(\omega_{Hn}^2 - \omega_{Ln}^2) \quad (7)$$

$$\beta_n = (\omega_{Hn}^2 \cdot Iq_{Ln} - \omega_{Ln}^2 \cdot Iq_{Hn})/((\omega_{Hn}^2 - \omega_{Ln}^2)) \quad (8)$$

It can be understood that $Iq_{Mn}$ can be obtained as indicated in the following Formula (9) from the above Formula (4) and the previously obtained $\omega_{Mn}$, $\alpha_n$, and $\beta_n$.

$$Iq_{Mn} = \alpha_n \cdot \omega_{Mn}^2 + \beta_n \quad (9)$$

That is, if a plurality of operation points on the same load characteristic have known angular velocities and torque current values at ventilation air volumes, $(\omega_{Mn}, Iq_{Mn})$ at an arbitrary operation point on that load characteristic is obtainable by calculation. Furthermore, $(\omega_{Mn}, Iq_{Mn})$ can be similarly calculated also on other load characteristics. FIG. 7 is a diagram indicating an example of actually measured values in the first embodiment. FIG. 8 is a diagram indicating angular velocities and torque current values obtained from the actually measured values indicated in FIG. 7. For example, angular velocities and torque current values at which to provide an arbitrary ventilation air volume QM indicated in FIG. 8 are obtainable from the minimum number of actually measured values of the ventilation air volume QH and the ventilation air volume QL indicated in FIG. 7.

That is, even if a large number of parameters are not sequentially stored in the storage device, it is possible to control the ventilation air volume to provide an arbitrary ventilation air volume from parameters at four operation points stored in a microcomputer. Accordingly, it is possible to achieve constant air volume control steplessly without increasing the storage capacity.

The torque current command generation unit 16 performs the above-described calculation to thereby obtain the torque current command value Iq* for operating the ventilation blower 200 at a target ventilation air volume. In the torque current command generation unit 16, parameters at at least two or more or four or more operation points are stored in advance. A command Q* of a target ventilation air volume is directed to the torque current command generation unit 16. For example, if the command value is QM, the torque current command generation unit 16 obtains, from the stored parameters, parameters at operation points at which the ventilation air volume is QM. Furthermore, the obtained operation points are connected to one another, thereby approximating a ω-Iq characteristic that is an air volume characteristic. Then, control is performed such that the actual operation angular velocity and the torque current value are on the approximated ω-Iq characteristic. The actual operation angular velocity is an angular velocity at the time the ventilation blower 200 is operated.

The permanent-magnet synchronous motor 100 is controlled using the ω-Iq characteristic obtained by the torque current command generation unit 16, such that the target air volume can be obtained.

Calculation of parameters at a target air volume will be described with reference to FIG. 5. In a case where operation points having the parameters stored in advance in the torque current command generation unit 16 are on the same load characteristic, but are two operation points (i.e., a first operation point 111 and a second operation point 112) having different ventilation air volumes QL and QH, a parameter at an operation point (third operation point 113) at the ventilation air volume QM on the load characteristic is obtained by calculation. That is, if parameters at two operation points are stored, operation at an arbitrary ventilation air volume can be accurately achieved on the load characteristic.

In a case where operation points having the parameters stored in advance in the torque current command generation unit 16 include two different operation points (the first operation point 111 and the second operation point 112), and two different operation points (a fourth operation point 114 and a fifth operation point 115), the first operation point 111 and the second operation point 112 being on one load characteristic, but having different ventilation air volumes QL and QH, the fourth operation point 114 and the fifth operation point 115 being on another load characteristic but having different ventilation air volumes QL and QH, the following control can be performed.

That is, the torque current command generation unit 16 calculates, from the parameter at the first operation point 111 and the parameter at the second operation point 112, the parameter on the load characteristic at the third operation point 113 at which the ventilation air volume is QM. Furthermore, the torque current command generation unit 16 calculates, from the parameter at the fourth operation point 114 and the parameter at the fifth operation point 115, the parameter on the load characteristic at a sixth operation point 116 at which the ventilation air volume is QM. Then, from the parameter at the third operation point 113 and the parameter at the sixth operation point 116, the torque current command generation unit 16 approximates the ω-Iq characteristic where the ventilation air volume is constant at QM. The convergence of the parameters to the approximated ω-Iq characteristic on an arbitrary load characteristic makes it possible to control the ventilation air volume such that the ventilation air volume becomes QM. The torque current command value Iq* is obtained by the convergence of the parameters. Accordingly, if parameters at four operation points are stored, operation on an arbitrary load characteristic at an arbitrary ventilation air volume can be accurately achieved.

Note that the parameters stored in advance are parameters actually measured at each operation point for each ventilation blower 200.

FIG. 9 is a diagram indicating an example in which operation points at which to provide a constant target ventilation air volume have multiple points on load characteristics for use in the approximation. As indicated in FIG. 9, parameters of operation points for providing the ventilation air volume QL and the ventilation air volume QH, which are on load characteristics n1, n2, . . . , m−1, and m, are stored in advance. Parameters of operation points for providing a target air volume, which are on the load characteristics n1, n2, . . . , m−1, and m, are calculated from the parameters at the large number of those stored operation points. The thus calculated parameters makes the approximated ω-Iq characteristic where the ventilation air volume is constant at the target air volume. As the number of parameters used for approximation increases, the accuracy of approximation improves. As the number of parameters stored in advance increases, the storage capacity and the number of calculations of the storage device increase, but the accuracy of the ventilation air volume can be improved.

As described above, according to the ventilation blower 200 of the first embodiment, parameters (angular velocity ω and torque current value Iq) required by control software or the like at two or more operation points are stored to thereby control the air volume accurately without deviation between the theoretical characteristic and the actual characteristic. Furthermore, an operation point at which to obtain another ventilation air volume is derived from the stored operation points by calculation, thereby making it possible to easily achieve constant control at an arbitrary ventilation air volume instead of stepwise air volume selection.

Furthermore, by incorporating a control circuit related to air volume control and motor drive control in the permanent-magnet synchronous motor 100, it is possible to save the physical size of a control circuit installed outside the permanent-magnet synchronous motor 100. As a result, the proportion of the volume occupied by the control circuit in the ventilation blower 200 can be reduced, and the volume of the product can be reduced.

Figure 10:
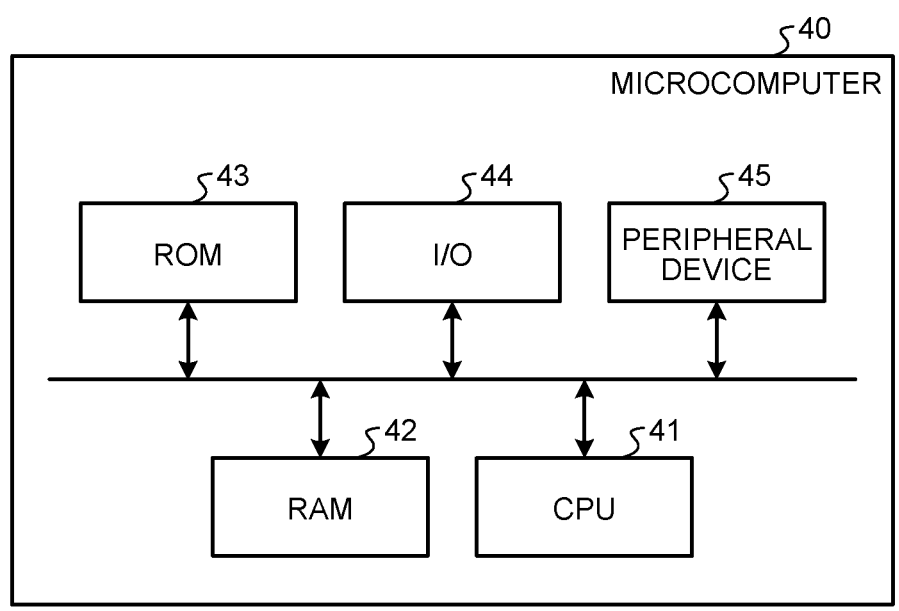
FIG. 10 is a block diagram illustrating a configuration of a microcomputer in the first embodiment.

FIG. 10 is a block diagram illustrating a configuration of a microcomputer in the first embodiment. A microcomputer 40 includes a central processing unit (CPU) 41 that executes calculation and control, a random access memory (RAM) 42 that the CPU 41 uses as a work area, a read only memory (ROM) 43 that stores a program and data, input/output (I/O) 44 that is hardware for signal communication with the outside, and a peripheral device 45 including a clock generating oscillator. The functions of the motor torque controller 53 in the first embodiment excluding the function of detecting the motor current by the current detector 5 and the function of the voltage detector 6 can be realized by the microcomputer 40. The control executed by the microcomputer 40 can be realized by the CPU 41 executing the program that is software stored in the ROM 43. The ROM 43 may be a non-volatile memory such as a rewritable flash memory. Furthermore, the ROM 43 also functions as a storage device in which information at operation points is stored in advance in the torque current command generation unit 16.

The above configurations illustrated in the embodiment are examples, and can be combined with other known techniques, embodiments can be combined with each other, and the above configurations can be partly omitted or changed without departing from the gist.

REFERENCE SIGNS LIST

1 alternating-current power supply; 2 rectifying and smoothing circuit; 2*c* smoothing capacitor; 2*d* rectifier circuit; 3 inverter main circuit; 5 current detector; 6 voltage detector; 8 voltage calculation unit; 9 magnetic pole position detector; 10 velocity calculation unit; 11 three-phase voltage calculation unit; 12 PWM circuit; 13 drive circuit; 16 torque current command generation unit; 20 motor body; 21 stator; 31 to 36 transistor; 40 microcomputer; 41 CPU; 42 RAM; 43 ROM; 44 I/O; 45 peripheral device; 53 motor torque controller; 60 impeller; 61 casing; 100 permanent-magnet synchronous motor; 100*a* output shaft; 200 ventilation blower; 341, 351 shunt resistor.

The invention claimed is:

1. A ventilation blower comprising:
an inverter main circuit including a plurality of switching elements to be switched to convert direct-current power into three-phase alternating-current power;
a motor body including a stator and a rotor and to be driven by the inverter main circuit;
a motor control circuit to control the inverter main circuit; and
a memory, wherein
the memory stores an angular velocity of the rotor and a torque current value at a first operation point at which to obtain a first air volume on a first load characteristic, and the angular velocity and the torque current value at a second operation point at which to obtain a second air volume on the first load characteristic, the second air volume being different from the first air volume,
the motor control circuit calculates, from the angular velocity and the torque current value at the first operation point and the angular velocity and the torque current value at the second operation point, the angular velocity and the torque current value at a third operation point at which to obtain a third air volume on the first load characteristic, and
the motor control circuit causes the inverter main circuit to drive the motor body with the angular velocity and the torque current value at the third operation point.

2. The ventilation blower according to claim 1, wherein
the memory stores the angular velocity and the torque current value at a fourth operation point at which to obtain the first air volume on a second load characteristic different from the first load characteristic, and the angular velocity and the torque current value at a fifth operation point at which to obtain the second air volume on the second load characteristic, and
the motor control circuit calculates, from the angular velocity and the torque current value at the fourth operation point and the angular velocity and the torque current value at the fifth operation point, the angular velocity and the torque current value at a sixth operation point at which to obtain a third air volume on the second load characteristic, and obtains, from the angular velocity and the torque current value at the third operation point and the angular velocity and the torque current value at the sixth operation point, an air volume characteristic that indicates a relationship between the angular velocity and the torque current value.

* * * * *